(12) United States Patent
Nottingham et al.

(10) Patent No.: US 6,669,369 B1
(45) Date of Patent: Dec. 30, 2003

(54) FLUID DYNAMIC BEARING SECONDARY CAPILLARY SEAL RESERVOIR

(75) Inventors: Robert Alan Nottingham, Santa Cruz, CA (US); Norbert Steven Parsoneault, Scotts Valley, CA (US); Jeffry Arnold LeBlanc, Aptos, CA (US); Troy Michael Herndon, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/267,704

(22) Filed: Oct. 9, 2002

Related U.S. Application Data
(60) Provisional application No. 60/390,388, filed on Jun. 21, 2002.

(51) Int. Cl.[7] ................................................. F16C 33/74
(52) U.S. Cl. ........................................ 384/110; 384/107
(58) Field of Search ................................. 384/110, 107, 384/100, 119, 124

(56) References Cited

U.S. PATENT DOCUMENTS

| | | |
|---|---|---|
| 5,112,142 A | 5/1992 | Titcomb et al. |
| 5,246,294 A | 9/1993 | Pan |
| 5,423,612 A | 6/1995 | Zang et al. |
| 5,685,647 A | 11/1997 | Leuthold et al. |
| 5,980,113 A | 11/1999 | Grantz |

*Primary Examiner*—Lenard A. Footland
(74) *Attorney, Agent, or Firm*—Moser, Patterson & Sheridan LLP

(57) ABSTRACT

The present invention relates to the field of fluid dynamic bearings. Specifically, the present invention provides a secondary fluid reservoir for the fluid used in a fluid dynamic bearing in a high-speed spindle motor assembly.

20 Claims, 4 Drawing Sheets

FLUID DYNAMIC BEARING SECONDARY CAPILLARY SEAL RESERVOIR

CROSS REFERENCE TO A RELATED APPLICATION

This application claims priority to provisional application Serial No. 60/390,388, filed Jun. 21, 2002, entitled "FDB Secondary Capillary Seal Reservoir" invented by Robert A. Nottingham, Norbert S. Parsoneault, Jeffrey A. LeBlanc, and Troy M. Herndon, assigned to the assignee of the present application, and incorporated herein by reference.

FIELD OF THE INVENTION

The present invention relates to the field of computer disk drives, specifically, those having fluid dynamic bearings.

BACKGROUND OF THE INVENTION

Disk drive memory systems have been used in computers for many years for the storage of digital information. Information is recorded on concentric tracks of a magnetic disk medium, the actual information being stored in the forward magnetic transitions within the medium. The disks themselves are rotatably mounted on a spindle. Information is accessed by a read/write transducer located on a pivoting arm that moves radially over the surface of the rotating disk. The read/write heads or transducers must be accurately aligned with the storage tracks on the disk to ensure proper reading and writing of information.

During operation, the disks are rotated at very high speeds within an enclosed housing using an electric motor generally located inside a hub or below the disks. Such spindle motors may have a spindle mounted by two ball bearing systems to a motor shaft disposed in the center of the hub. The bearing systems are spaced apart, with one located near the top of the spindle and the other spaced a distance away. These bearings allow support of the spindle or hub about the shaft, and allow for a stable rotational relative movement between the shaft and the spindle or hub while maintaining accurate alignment of the spindle and shaft. The bearings themselves are normally lubricated by highly refined grease or oil.

The conventional ball bearing system described above is prone to several shortcomings. First is the problem of vibration generated by the balls rolling on the bearing raceways. This is one of the conditions that generally guarantees physical contact between raceways and balls, in spite of the lubrication provided by the bearing oil or grease. Bearing balls running on the microscopically uneven and rough raceways transmit the vibration induced by the rough surface structure to the rotating disk. Such vibration results in misalignment between the data tracks and the read/write transducer, limiting the data track density and the overall performance of the disk drive system. Further, mechanical bearings are not always scalable to smaller dimensions. This is a significant drawback, since the tendency in the disk drive industry has been to shrink the physical dimensions of the disk drive unit.

As an alternative to conventional ball bearing spindle systems, much effort has been focused on developing a fluid dynamic bearing (FDB). In these types of systems, lubricating fluid, either gas or liquid, functions as the actual bearing surface between a shaft and a sleeve or hub. Liquid lubricants comprising oil, more complex fluids, or other lubricants have been utilized in such fluid dynamic bearings.

The reason for the popularity of the use of such fluids is the elimination of the vibrations caused by mechanical contact in a ball bearing system and the ability to scale the fluid dynamic bearing to smaller and smaller sizes. In designs such as the single plate FDB, two thrust surfaces generally are used to maintain the axial position of the spindle/shaft assembly in relation to other components such as the sleeve.

Clearly, it is essential to maintain the volume, position and integrity of the fluid in a fluid dynamic bearing system. Accordingly, there have been improvements to almost every component of such systems, including the addition of seals, various designs for bearing shapes, specific fluids to be used, and the like.

Thus, there is an interest in the art to assure the volume, position and integrity of fluid in a fluid dynamic bearing system.

SUMMARY OF THE INVENTION

The present invention is intended to provide a fluid reservoir to maintain the volume and integrity of the fluid in a fluid dynamic bearing assembly. This and other objectives and advantages are achieved by providing a secondary reservoir in a fluid dynamic bearing design between a bearing and an adjacent component such as a bearing sleeve or seal member.

Specifically, the present invention provides an annular bearing cone for a fluid dynamic bearing in a disk drive comprising: a bottom, a top and a middle; a central annular opening; upper walls angling out from the top to the middle; lower walls angling out from the bottom to the middle to meet the upper walls; and axial grooves in the upper walls of the annular bearing cone. The annular cone may also have at least one recirculation hole in communication with the central annular opening where there are axial grooves on the walls of the central annular opening between the recirculation hole and the top of the bearing cone.

BRIEF DESCRIPTION OF THE DRAWINGS

For a fuller understanding of the present invention, reference is made to the accompanying drawings in the following detailed description.

DETAILED DESCRIPTION OF THE PREFERRED EMBODIMENTS

Reference will now be made in detail to exemplary embodiments of the invention, examples of which are illustrated in the accompanying drawings. While the invention will be described in conjunction with these embodiments, it is to be understood that the described embodiments are not intended to limit the invention solely and specifically to only those embodiments, or to use solely in the disk drive which is illustrated. On the contrary, the invention is intended to cover alternatives, modifications and equivalents that may be included within the spirit and scope of the invention as defined by the attached claims. Further, both hard disk drives and spindle motors are both well known to those of skill in this field. In order to avoid confusion while enabling those skilled in the art to practice the claimed invention, this specification omits such details with respect to known items. The embodiments of the present invention are intended to maintain the volume and integrity of a fluid in a fluid dynamic bearing system.

Figure 1:
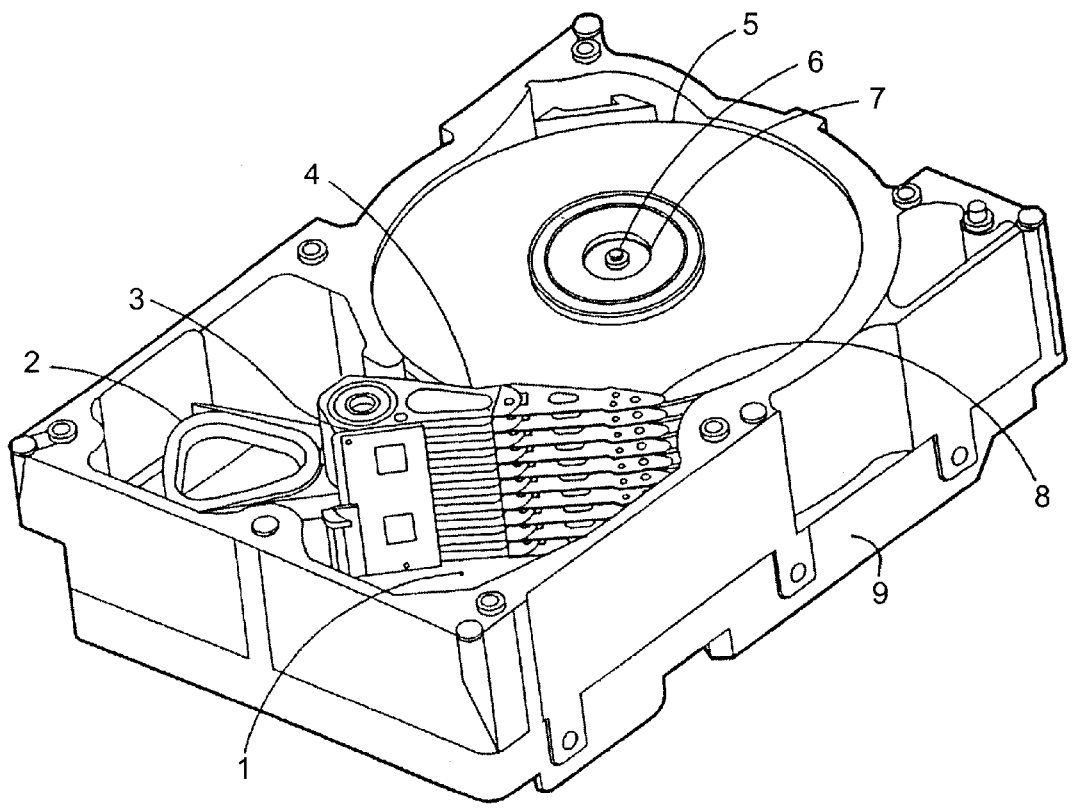
FIG. 1 illustrates an example of a magnetic disk drive in which the invention may be employed.

FIG. 1 illustrates an example of a magnetic disk drive in which the invention may be employed. At least one magnetic disk 5 having a plurality of concentric tracks for recording information is mounted on a spindle 7. The spindle is mounted on spindle support shaft 6 for rotation about a central axis. As the disks are rotated by the motor, a transducer 8 mounted on the end of an actuator end 4 is selectively positioned by a voice coil motor 2 rotating about a pivot axis 3 to move the transducer 8 from track to track across the surface of the disk 5. The elements of the disk drive are mounted on base 1 in a housing 9 that is typically sealed to prevent contamination (a top or cover of housing 9 is not shown). The disks 5 are mounted on spindle 7.

Figure 2:
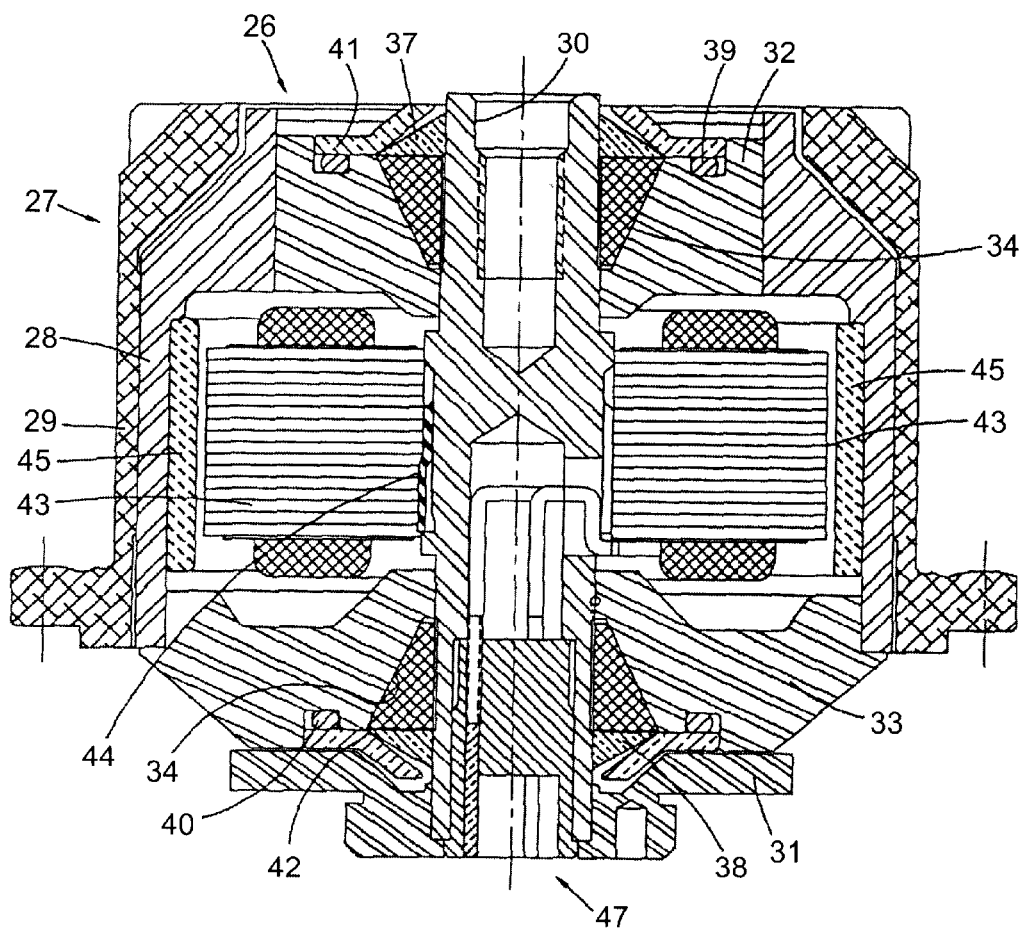
FIG. 2 is a vertical sectional view of a fluid dynamic bearing cartridge.
Figure 3:
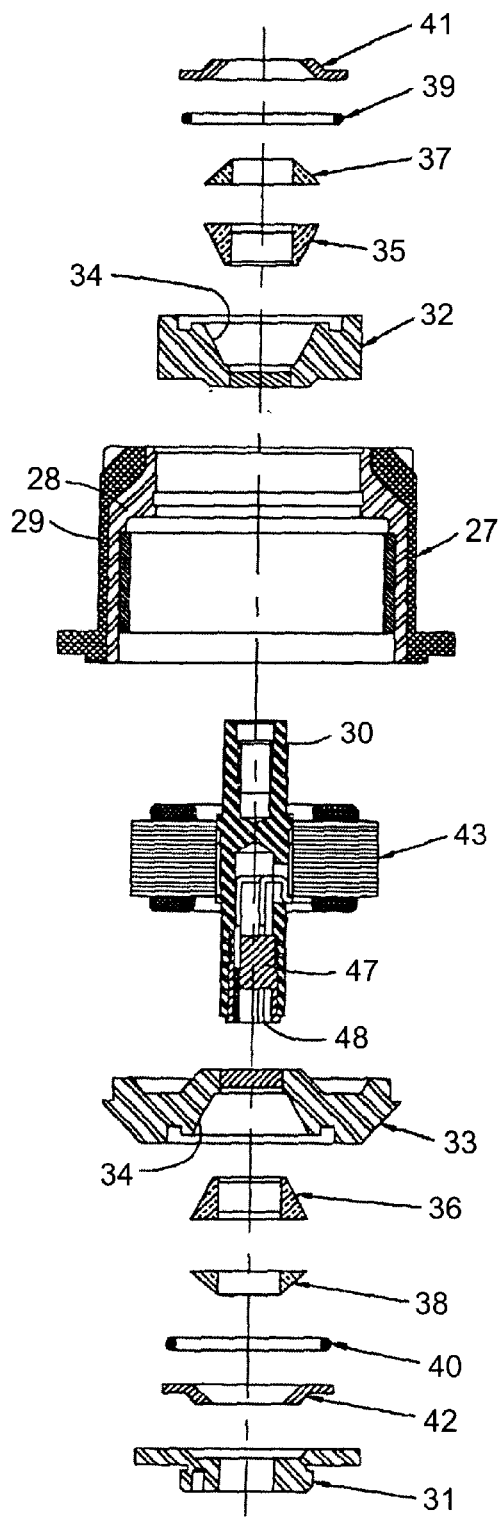
FIG. 3 is an exploded view of the fluid dynamic bearing cartridge of FIG. 2.

FIGS. 2 and 3 show an exemplary design of a bearing cartridge 26 that may be part of the spindle identified in FIG. 1. Bearing cartridge 26 supports a spindle hub assembly 27, which is comprised of a back iron 28 and a cover 29. Bearing cartridge 26 includes a central spindle shaft 30 may be press fit within a bottom mounting flange 31 which is threadably secured to base 12. Bearing cartridge 26 also includes an upper bearing sleeve 32 and a lower bearing sleeve 33. Both upper bearing sleeve 32 and lower bearing sleeve 33 include conical bearing surfaces 34. Bearing surfaces 34 engage a pair of bearing cones 35 and 36.

Bearing cartridge 26 also includes upper and lower seal cones 37 and 38, seal O-rings 39 and 40, and shield seals 41 and 42. Seal cones 37 and 38 are press fit onto spindle shaft 30 and shield seals 41 and 42 are press fit onto bearing sleeves 32 and 33. The spindle motor includes stator windings 43 which are secured about spindle shaft 30 by means of a clip 44 and magnets 45, which are secured to back iron 28.

An electric connector assembly 47 is mounted within the lower end of spindle shaft 30 and includes electrical leads that are connected to the electrical windings of the motor. Connector assembly 47 also includes connector pins 48, which provide for reception for connector from an electrical power source.

Figure 4:
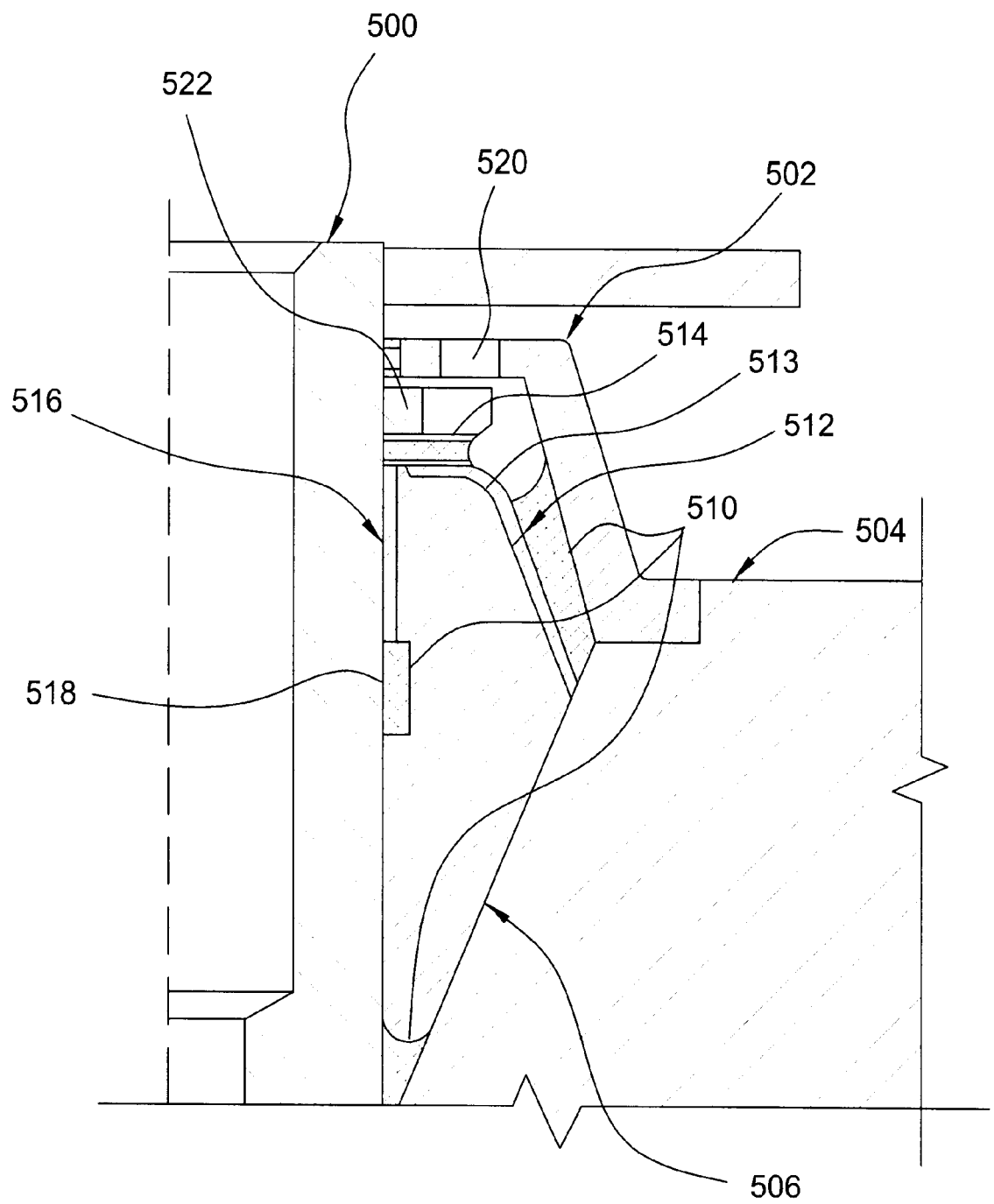
FIG. 4 is a cross-sectional view of the reservoir system of the present invention.

FIG. 4 shows an embodiment of a reservoir system of the present invention. FIG. 4 shows a shaft 500, a shield seal member 502, a bearing sleeve 504, a bearing cone 506, and a fill hole 520 in shield seal member 502.

A fluid reservoir A is shown at 510. Reservoir A provides fluid between bearing cone 506 and shield seal member 502, and bearing cone 506 and bearing sleeve 504. A second reservoir, reservoir B, is shown at 514 and is connected to reservoir A 510 by passage 512, which creates a capillary path between reservoir A 510 and reservoir B 514. In one embodiment, there may be an axial groove or grooves 513 down the side of bearing cone 506. Axial groove 513, if present, can be longitudinal notches or scratches along the cone 506 in passage 512 from reservoir A 510 to reservoir B 514. Such longitudinal scratches or grooves 513 enhance the ability of the passage 512 to provide a capillary path to facilitate the flow of fluid between the reservoirs.

Fluid can be added to the system through fill hole 520. When fluid is added to the system both reservoirs A and B fill with fluid. Initially the gap of reservoir B 514 between annular seal member 522 and bearing cone 506 is tighter than the gap for reservoir A between bearing cone 506 and shield seal member 502. The capillary action is such that fluid is first drawn in to reservoir B 514.

However, should reservoir A 510 get depleted and reservoir B 514 be filled, the gap between bearing cone 506 and shield seal member 502 for reservoir A 510 will be smaller than the gap for reservoir B 514 between annular shield member 522 and bearing cone 506 (i.e., the meniscus width of reservoir A becomes smaller than the meniscus width of reservoir B). Capillary action will now act such that fluid will travel from reservoir B to reservoir A via passage 512. The gap and meniscus size for reservoir A for 510 and reservoir B 514 are variable depending on the fill level of each reservoir. If the levels of reservoirs A and B are full and stay full, there will be no net movement of fluid from reservoir B to A or from A to B. If the meniscus width of reservoir A becomes smaller than that of B, there will be net movement of fluid from reservoir B to reservoir A.

Note that the embodiment of FIG. 4 shows a shield seal member 502 abutting sleeve 504 adjacent bearing cone 506 to form reservoir A, and an annular seal 522 adjacent bearing cone 506 to form reservoir B. An alternative embodiment to this embodiment might simply be to configure the bearing sleeve in such a way to serve the purpose of all three elements; that is, the bearing sleeve, the shield seal member and the annular seal, or two out of three of these elements. Essentially, one skilled in the art should note that the present invention requires merely a structure adjacent bearing cone 506 to form reservoirs A and B and passage 512; and the present invention should not be limited to a particular structure or set of structures.

Another aspect of the present invention is shown in FIG. 4. A cross-section of a recirculation hole 518 is shown. Recirculation hole 518 is a structural element of an exemplary fluid redistribution system of a fluid dynamic bearing. Such recirculation holes are common in fluid dynamic bearing systems to assure that the distribution of fluid throughout the system is even. In this case, reservoir B 514 is connected to recirculation hole 518 by passage 516. Passage 516 may also have axial grooves thereon similar to axial grooves 513 on the outside of bearing cone 506. Passage 516 provides a capillary path from recirculation hole 518 to reservoir B. Capillary passage 516 can be used in addition to, or as an alternative to, the passage 512 between reservoir A 510 and reservoir B 514. Thus, passage 516 between reservoir B 514 and recirculation hole 518 could be used to remove fluid from reservoir B instead of using passage 512 and the optional axial groove 513 for transfer of fluid from reservoir B 514 to reservoir A 510.

Other features and advantages of the invention will become apparent to a person of skill in the art who studies the following disclosure of preferred embodiments.

What is claimed is:

1. An annular bearing cone for a fluid dynamic bearing in a disk drive comprising:

a bottom, a top and a middle;

a central annular opening;

upper walls angling out from the top to the middle;

lower walls angling out from the bottom to the middle to meet the upper walls; and grooves of a general axial nature in the upper walls.

2. The annular bearing cone of claim 1, further comprising at least one recirculation hole in communication with the central annular opening.

3. The annular bearing cone of claim 2, further comprising walls of the central annular opening, and grooves of a general axial nature on the walls of the central annular opening between the recirculation hole and the top.

4. The fluid annular bearing cone of claim 1, wherein the top has a generally flat region.

5. The fluid annular bearing cone of claim 1, wherein the bottom has a generally flat region.

6. A fluid dynamic bearing assembly comprising:
   the annular bearing cone of claim 1;
   a bearing sleeve adjacent the annular bearing cone;
   a shield seal member abutting the bearing sleeve and adjacent the annular bearing cone;
   an annular shield member above the annular bearing cone;
   a first fluid reservoir between the annular bearing cone and the shield seal member; and
   a second fluid reservoir between the annular bearing cone and the annular shield member.

7. The fluid dynamic bearing assembly of claim 6, further comprising at least one recirculation hole in the annular bearing cone in communication with the central annular opening in the annular bearing cone.

8. The fluid dynamic bearing assembly of claim 7, further comprising walls of the central annular opening and grooves of a general axial nature on the walls of the central annular opening between the recirculation hole and the top of the annular dynamic bearing assembly.

9. The fluid dynamic bearing assembly of claim 6, wherein the top of the annular bearing cone has a flat region.

10. The fluid dynamic bearing assembly of claim 6, wherein the bottom of the annular bearing cone has a flat region.

11. A fluid dynamic bearing assembly comprising:
   an annular bearing cone having a central annular opening, a bottom, a top and a middle, upper walls angling out from the top to the middle, lower walls angling out from the bottom to the middle to meet the upper walls;
   a bearing sleeve adjacent the annular bearing cone;
   a shield seal member abutting the bearing sleeve and adjacent the annular bearing cone;
   an annular shield member above the annular bearing cone;
   a first fluid reservoir between the annular bearing cone and the shield seal member; and
   a second fluid reservoir between the annular bearing cone and the annular shield member.

12. The fluid dynamic bearing assembly of claim 11, further comprising at least one recirculation hole in the annular bearing cone in communication with the central annular opening in the annular bearing cone.

13. The fluid dynamic bearing assembly of claim 12, further comprising walls of the central annular opening and grooves of a general axial nature on the walls of the central annular opening between the recirculation hole and the top of the annular fluid dynamic bearing assembly.

14. The fluid dynamic bearing assembly of claim 11, further comprising grooves of a general axial nature in the upper walls of the annular bearing cone.

15. The fluid dynamic bearing assembly of claim 11, wherein the top of the annular bearing cone has a flat region.

16. A fluid dynamic bearing assembly comprising:
   an annular bearing cone having a central annular opening, a bottom, a top and a middle, upper walls angling out from the top to the middle, lower walls angling out from the bottom to the middle to meet the upper walls;
   a bearing sleeve adjacent the annular bearing cone;
   a shield seal member abutting the bearing sleeve and adjacent the annular bearing cone;
   an annular shield member above the annular bearing cone;
   a first fluid reservoir between the annular bearing cone and the shield seal member;
   a second fluid reservoir between the annular bearing cone and the annular shield member; and
   capillary path means between the first fluid reservoir and the second fluid reservoir.

17. The fluid dynamic bearing assembly of claim 16, further comprising at least one recirculation hole in the annular bearing cone in communication with the central annular opening in the annular bearing cone.

18. The fluid dynamic bearing assembly of claim 17, further comprising walls of the central annular opening and capillary path means on the walls of the central annular opening between the recirculation hole and the top of the annular dynamic bearing assembly.

19. The fluid dynamic bearing assembly of claim 16, wherein the top of the annular bearing cone has a flat region.

20. The fluid dynamic bearing assembly of claim 16, wherein the bottom of the annular bearing cone has a flat region.

* * * * *